G. E. DICKSON.
PREMIUM INSURANCE POLICY BLANK.
APPLICATION FILED JULY 18, 1912.

1,176,277.

Patented Mar. 21, 1916

XX Casualty Company — Date of issue

Accident Indemnities

ARTICLE I. If the assured suffers total disability the Company will pay to the assured an amount per month equal to one-third of the amount of purchase shown hereon for a term not exceeding three months ARTICLE II. If within 90 days from the date of the accident the assured suffers death as a direct result of the bodily injury, the Company will pay to the Executors, Administrators or Assigns of the assured an amount equal to the amount of the purchase shown hereon. The total amount payable for death under this and all other similar policies in this Company held by the Assured shall not exceed an aggregate of one hundred and fifty dollars ($150)

ARTICLE III. This policy expires and is void ninety days from the date of issue stamped hereon.

Amount of Purchase 1 X Dollar
Amount of Purchase 2 X Dollars
Amount of Purchase 3 X Dollars
Amount of Purchase 4 X Dollars
Amount of Purchase 5 X Dollars
Amount of Purchase 6 X Dollars
Amount of Purchase 7 X Dollars
Amount of Purchase 8 X Dollars
Amount of Purchase 9 X Dollars
Amount of Purchase 10 X Dollars Date of issue Name of Purchaser Witnesses
Robert S. M°Creadie
Arthur W. Nelson Inventor
George E. Dickson
by
Atty.

UNITED STATES PATENT OFFICE.

GEORGE E. DICKSON, OF CHICAGO, ILLINOIS.

PREMIUM-INSURANCE-POLICY BLANK.

1,176,277.   Specification of Letters Patent.   Patented Mar. 21, 1916.

Application filed July 18, 1912. Serial No. 710,241.

*To all whom it may concern:*

Be it known that I, GEORGE E. DICKSON, a citizen of the United States, and a resident of Chicago, Cook county, Illinois, have invented a certain new, useful, and Improved Premium-Insurance-Policy Blank, of which the following is a specification.

My invention relates generally to trade securing premium devices, and has special reference to insurance premium blanks.

A vast number of merchants use one sort or another of premium giving plan for the purpose of increasing the sale of merchandise and also for increasing their patronage. Such plans consist generally in giving to the customer a ticket of some kind on which the value of the purchase is marked, a certain number of which are redeemable either for cash or for an article of merchandise. Such plans have proven to be excellent trade winners and as a result merchants are willing to spend a considerable sum for such purpose.

The general object of my invention is to provide premium giving means which will be a greater inducement to the purchase of merchandise than means hitherto devised.

A further object of my invention is to provide an improved trade securing premium which may be used for the general purpose above outlined.

A further object is to provide a premium insurance blank or policy adapted for use in giving insurance as a premium with the purchase of merchandise.

Another object of my invention is to provide a device which as a premium will induce small buyers to maintain an amount of life, accident, or welfare insurance commensurate with or proportioned to their average expenditures for groceries, meats, clothing, and other supplies.

I have worked out a table of insurance of such value, determined by the purchases which a customer would make of merchandise, that insurance companies according to their tables of risk can safely issue insurance at a cost which merchants ordinarily spend for premium purposes.

My invention consists generally in a unique premium insurance policy blank embodying the features outlined and adapted for use by merchants in giving insurance to their customers as a premium with the purchase of goods.

My invention consists further in an insurance policy blank of novel form and arrangement of parts, certain of which carry "condition" clauses and other of which carry "value fixing" clauses, the value fixing clauses depending for their interpretation upon the condition clause carrying portion, and a stub or record portion associated with the value fixing portion.

My invention consists further in an insurance policy blank comprising a fixed term portion constituting the policy proper, a plurality of separably detachable, policy, value determining, portions attached thereto, and a stub or policy record portion attached to the value determining portion.

My invention also resides in a premium insurance policy blank comprising a fixed term portion constituting the policy proper, a stub portion constituting a record of the insurer's name, the value and number of the policy, and an intermediate portion comprising a plurality of separably detachable value determining portions, the device as a whole being easily divisible into two parts, a portion of the value determining strips when severed being attached to the fixed term portion, and the remainder to the stub or record portion.

My invention consists further in a premium insurance policy blank of such form, arrangement of parts, and interdependence of conditions on the various portions, that the above named objects, as well as others which will appear, are attained.

My invention will be more readily understood by reference to the accompanying drawing which illustrates one embodiment thereof.

The policy blank as shown in the drawing consists of a single sheet of paper rectangular in form, the length of which is several times the width. It comprises three main portions, A, B, and C. The portion A contains the name of the insurance company, date of issue, number of the policy and one or more clauses fixing the terms, conditions, and provisions of the policy. For example, as shown in the drawing, article 1 is a clause relative to injury, article 2 relative to death suffered as a result of bodily injury, and article 3 a clause fixing the maximum premium of the policy in any event. It will be seen that the clauses 1 and 2 in and of themselves fix the term of the policy subject to article 3, but that the value of the policy must be determined by reference to the portion B. These clauses may therefore, be called "term fixing and value interpreting clauses" and the portion A will herein be called the policy proper. I divide the portion B by a plurality of transversely scored lines $b'$ into a plurality of strips $b$. Each of these strips contains the words "Amount of purchase" followed by a value mark. In the drawing, I have indicated the value mark on the strip nearest the portion A as "1 X Dollar;" on the next strip "2 X Dollars;" and so on ascending in value to the highest amount "10 X Dollars" on the strips contiguous the portion C. It will be understood that "X" merely represents a value unit which may be anything desired. These value marks as clearly shown by the words designate the amount of goods purchased by the customer, and as will be explained, the device as a whole is severed into two parts on one of the scored lines $b'$. The portion B will be referred to as the "value determining portion."

The portion C contains the printed words "Date of issue", "Name of purchaser", "Policy number", and several blank lines for insertion of the date and name. The date of issue may be conveniently inserted by means of a rubber stamp, so that the only work necessary in making out the policy is to write the name of the purchaser on the policy and tear it into two parts on one of the scored lines $b'$ such as will leave upon the portion A, a strip containing the value of the purchase. Let us consider a customer making a purchase of "5 X Dollars". The blank as a whole is torn into two parts on the line $b^6$. The portion D is given to the customer and the portion E retained by the merchant or sent by him to the insurance company for its records. Therefore the portion D indicates that the customer has made a purchase amounting to "5 X Dollars" and the portion A thereof interprets the meaning of the "5 X Dollars", namely, if the insured suffers injury article 1 states that the assured will be given one-third of "5 X Dollars" per month for a term not exceeding three months. If on the other hand, the assured suffers death, as a result of injury by article 2, his executors, administrators, or assigns will be given "5 X Dollars" providing the "5 X Dollars" with such other insurance policies of this nature as the insured may have, do not exceed an aggregate of one hundred and fifty ($150.00) dollars and providing the policy was not issued more than ninety days before the accident according to article 3.

The stub portion E has a complete record of the policy since it has the date of issue, the name of the purchaser, number and the value as indicated by the strip $b^6$. The strip $b^6$ contains a larger value than the policy, namely "6 X Dollars", but since the strips ascend in value in a certain pre-determined ratio, the amount of the policy is readily known. As indicated in the drawings it is "1 X Dollars" less than the amount on the strip $b^6$.

Not only does the value fixing portion so operate, but it also operates automatically to determine the amount of premium due from the merchant to the insurance company as this premium is a fixed percentage (say $2\frac{1}{2}\%$) of the total amount of purchase shown.

There are numerous advantages of my premium insurance policy blank. It appeals strongly to the purchaser since it has a large face value and virtually enables a person to maintain a definite amount of insurance. For instance, if a person trades constantly at a given store, notwithstanding the ninety day expiration clause, the purchaser will always have insurance for an amount equal to his average expenditures during the ninety days previous. Therefore, it operates automatically to fix the amount of the policy holder's insurance at exactly the amount required to cover the regular household expenditures for articles of daily use; ample insurance is thus provided while over-insurance is avoided. It is thoroughly adapted to the merchant's needs as a premium proposition because of its trade inducing character, because the clerical work necessary to its issuance is little, and because the cost to the merchant for such insurance is small. Further the insurance companies are enabled to sell much insurance which they could not otherwise sell and to sell the same at less cost since the personal solicitation of a multitude of small policy holders, and weekly or monthly collection of premiums is not required.

It is obvious that my device as shown and described accomplishes the objects set forth in this specification.

Having thus described my invention, I claim as new and desire to secure by Letters Patent:

A purchaser's premium, insurance, policy for consignment to a seller by an insurer and for issuance by the seller to a purchaser and which when issued, at one and the same time, operates to record the amount of the purchase and correspondingly fix the liability of the insurer to the purchaser and also the liability of the consignee seller to the insurer, and comprising a single sheet of paper composed of two end portions and a series of narrow intermediate portions all of the full width of the sheet, one of said end portions being printed to receive the purchaser's name and the date of the transaction, the other end portion being larger and being printed with the insurer's policy contract including terms whereby its value shall be fixed by an intermediate portion and requiring no signatures or names, and said intermediate portions being printed with value determining characters, increasing in order from the policy portion toward the name receiving portion and said intermediate portions being separated by lines extending the full width of the sheet, whereby said sheet may be readily divided into two parts, the larger part comprising the policy and the intermediate portion fixing the value thereof and the liability, to the purchaser and insurer, respectively, and the smaller part fixing the liability of the seller to the insurer, both parts recording the amount of the purchase and insurance.

In testimony whereof, I have hereunto set my hand, this 16th day of July, 1912, in the presence of two subscribing witnesses.

GEORGE E. DICKSON.

Witnesses:
ARTHUR W. NELSON,
JOHN R. LEFEVRE.